United States Patent

[11] 3,624,278

[72] Inventor Helmut Heckscher
Newton Center, Mass.
[21] Appl. No. 877,931
[22] Filed Nov. 19, 1969
[45] Patented Nov. 30, 1971
[73] Assignee Technical Operations, Incorporated
Burlington, Mass.

[54] AREA MULTIPLEX IMAGE RECORDING BY FLYING SPOT RASTER SCANNING EMPLOYING SPATIAL FILTERING
14 Claims, 8 Drawing Figs.

[52] U.S. Cl. .................... 178/5.2 R, 95/12.2, 178/5.4 CR, 178/6.7 R, 350/162 SF, 356/71
[51] Int. Cl. .................... H04n 5/84
[50] Field of Search .................... 178/5.4 CR, 5.2, 6.7 R, 6.7 A; 95/12.2; 355/40; 350/162 SF; 356/71

[56] References Cited

UNITED STATES PATENTS

| | | | |
|---|---|---|---|
| 1,742,543 | 1/1930 | Ives | 178/6.7 |
| 3,408,143 | 10/1968 | Mueller | 95/12.2 |
| 3,419,672 | 12/1968 | Macouski | 178/5.4 STC |
| 3,478,661 | 11/1969 | Heckscher | 95/12.20 |
| 3,504,606 | 4/1970 | Macouski | 95/12.20 |
| 3,533,340 | 10/1970 | Macouski | 95/12.20 |
| 3,305,834 | 2/1967 | Cooper et al. | 350/162 SF |
| 3,314,052 | 4/1967 | Lohmann | 350/162 SF |

FOREIGN PATENTS

| | | | |
|---|---|---|---|
| 477,540 | 1929 | Germany | 178/6.7 |

*Primary Examiner*—Robert L. Griffin
*Assistant Examiner*—Donald E. Stout
*Attorneys*—Rosen & Steinhilper and John H. Coult

ABSTRACT: A plurality of images are stored on a common area of a recording medium by impressing the images respectively on spatial carriers having like spatial frequency but predetermined azimuthal separation. The images are selectively retrievable in a spatially coherent projection system. The disclosure stresses recording with one or more flying spot scanners the separate carrier-modulating images as rasters having said predetermined azimuthal separation.

HELMUT HECKSCHER
*INVENTOR*
ROSEN and STEINHILPER
and
JOHN H. COULT
*ATTORNEYS*

HELMUT HECKSCHER
*INVENTOR*
ROSEN and STEINHILPER
and
JOHN H. COULT
*ATTORNEYS*

HELMUT HECKSCHER
*INVENTOR*
ROSEN and STEINHILPER
and
JOHN H. COULT
*ATTORNEYS*

AREA MULTIPLEX IMAGE RECORDING BY FLYING SPOT RASTER SCANNING EMPLOYING SPATIAL FILTERING

BACKGROUND OF THE INVENTION

Prior art systems for area multiplex storage and retrieval of information have utilized various optical recording techniques for impressing the different images to be stored on spatial carriers. One method is to multiply a simple amplitude diffraction grating having a predetermined orientation or frequency with an image to be stored, and then photographically recording the product. A plurality of images are stored on a common area of a photosensitive recording material by exposing the material in succession to a sum of such products.

Another optical method which permits area multiplex recording of a plurality of images simultaneously utilizes a special diffraction grating comprising periodic arrays of spectral filters of different colors. All optical recording methods, however, suffer, in practice, from inherent and operating limitations which place a modest limit on the resolution of recorded imagery.

OBJECTS OF THE INVENTION

It is a general object of this invention to provide methods and apparatus for area multiplex storage and retrieval of information in which a plurality of images are stored on a common area of a recording material as respective modulations of spatial carriers having a predetermined azimuthal separation.

It is a more specific object to provide methods and apparatus for recording the carrier-modulating images using azimuth controlled flying spot raster scanning.

It is yet another object to provide a method of area multiplex information storage allowing point-by-point processing of each of the images during the recording operation.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

The principles of the invention may be implemented by a variety of structures and methods; this disclosure depicts embodiments utilizing both electron beam and optical detection and recording means, and teaching both sequential and simultaneous processes for detecting and recording a plurality of images. Common to each of the depicted embodiments is an illustration of a method and structure for recording in superposition on a common area of a recording material a plurality of different images of a single object or images of a plurality of different objects, each of the recorded images being caused to modulate a spatial carrier having a different azimuthal orientation.

In each embodiment each of the images to be recorded is scanned in a two-dimensional raster pattern, the line sweep directions of the respective rasters being given a different azimuthal orientation for each image. In correspondence with the scan of the images to be recorded, a predetermined characteristic of the images is detected and electrical signals representing the detected time-varying image characteristic is developed. A writing beam or beams for exposing a recording material sensitive to the beam is caused to write the signals respectively characterizing the plurality of images on a predetermined common area of the recording material in a like plurality of rasters, the rasters having an azimuthal separation which corresponds to the predetermined azimuthal separation of the pickup rasters. After exposure the recording material is developed to produce a record on which the plurality of images respectively modulate spatial carriers having said predetermined azimuthal separation.

Figure 1:
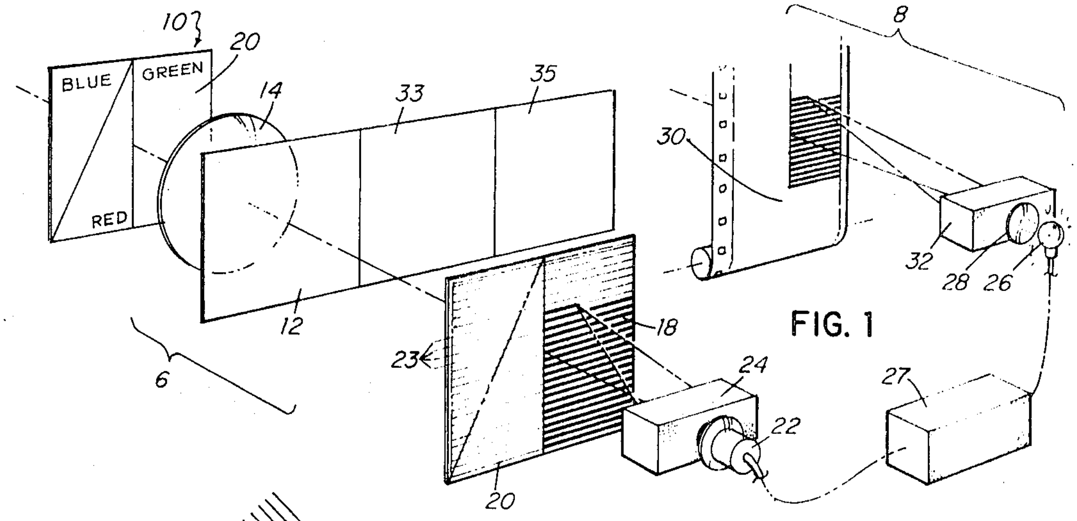
FIG. 1 is a highly schematic representation of a system for area multiplex recording in accordance with the teachings of this invention.

FIG. 1 depicts very schematically apparatus for recording in accordance with this invention a plurality of color separation images on a recording material which does not exhibit color values when developed. The FIG. 1 apparatus is illustrated as comprising a pickup section 6 and a recorder 8. In FIG. 1 a colored object 10 to be recorded is imaged through a green spectral filter 12 by a lens system 14, here shown as producing an erect image 18. The object 10 is colored as labeled; thus, the image 18 formed through the green filter 12 constitutes only the area circumscribed by unbroken lines. The broken lines 20 represent the nongreen (unimaged) portions of the object 10.

A detector 22 is caused to scan the image 18 in a raster pattern 23 by a two-dimensional scanner 24, shown in black box form in the interest of simplifying the explanation of the general nature and principles of the subject invention. Structure for implementing the scanner 24 will be shown in other embodiments discussed herein.

Electrical signals characterizing the scanned green separation image are illustrated as being supplied directly to a modulated beam generator 26 in recorder 8 after suitable amplification and processing by circuitry 27, shown schematically in black box form. Alternatively the signals might be stored on magnetic tape or broadcast to a recorder in a remote location. Computer processing of the signals before or after transmission to the recorder may be desirable.

The recorder 8 is shown as comprising the beam generator 26, which may generate a beam of electrons or radiation in any suitable region of the electromagnetic spectrum. The beam from the beam generator 26 is focused by focusing means 28 and scanned in a two-dimensional raster across a recording material 30 by a raster scanner 32.

Assuming appropriate synchronization of the pickup and recording scanners 24, 32, the recorded raster will be a facsimile of the detected raster and is thus illustrated in FIG. 1.

As described above, area multiplex records formed by the teachings of this invention are adapted for projection in a coherent projector which effects a separation of the respective images in a Fourier transform space, allowing independent processing of the images, and in the case of spectral zonal photography, the reinsertion of appropriate color values with spectral filters to enable reconstruction of full-color reproductions of the object recorded. As explained above, separation of the recorded images is made possible by assigning a unique azimuthal orientation to the spatial carrier on which each of the images is impressed. To this end, each of the separate images to be recorded is caused to be scanned by a raster whose line direction is unique for each image. In an embodiment preferred for spectral zonal photography, the carriers carrying green and blue information are mutually orthogonal and the carrier on which the red information rides is oriented at 45° to the green and blue information carriers.

Figure 2:
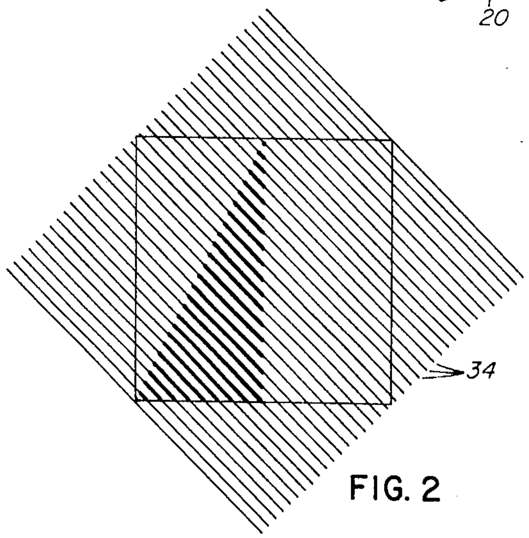
FIGS. 2 and 3 illustrate the manner in which different images to be recorded are scanned successively and recorded as information-bearing rasters having different azimuthal orientations.
Figure 3:
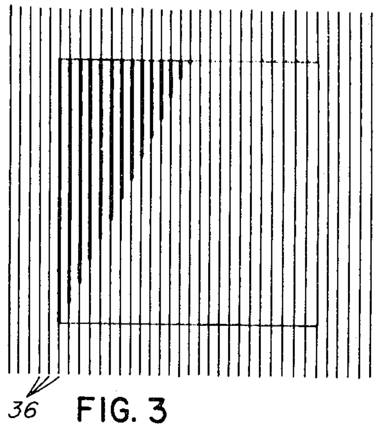

Referring to FIGS. 2 and 3 in conjunction with FIG. 1, to record the red color separation image, the red filter 33 is located on the optical axis and the scanners 24 and 32 are switched to a 45° scan mode, as shown in FIG. 2. The accentuated portions of the raster 34 shown in FIG. 2 characterize the detected and recorded red color separation image. To detect and record the blue color separation image, the blue filter 35 is disposed on the optical axis and the pickup and recording scanners 24 and 32 are switched to a corresponding vertical scan mode. The accentuated portions of the vertical raster 36 shown in FIG. 3 represent the detected and recorded blue color separation image. After development of the exposed recording material 30, the green, red, and blue color separation images may be retrieved to form a full color reconstruction by locating the developed record 37 in a coherent optical projection system as shown in schematic form in FIGS. 4 and 5. Briefly, the projection system includes a light source stage 38 illustrated as comprising a lamp 40 whose output is focused by a lens 42 onto a pinhole 44 in a mask 46. A condensing lens 48 collects light from the pinhole 44 and converges it through a film gate 50 for supporting the record 37 to a focus in a space commonly termed a Fourier transform space in which appears an amplitude distribution characterizing the spatial frequency content of the record 37.

The fourier transform of record 37 comprises three Dirac delta function arrays lying along axes parallel to the direction vectors of the green, red, and blue image carriers. About each point of the Dirac array is convolved a spectrum of spatial frequencies uniquely characterizing one of the color separation images —in particular, the one riding on the carrier whose direction vector is aligned with the axis of the particular array. The zeroth order of each array overlaps on the optical axis and thus results in a commingling of green, blue, and red information. The first and higher diffracted orders, however, contain only information associated with one color separation image.

Figures 4, 5:
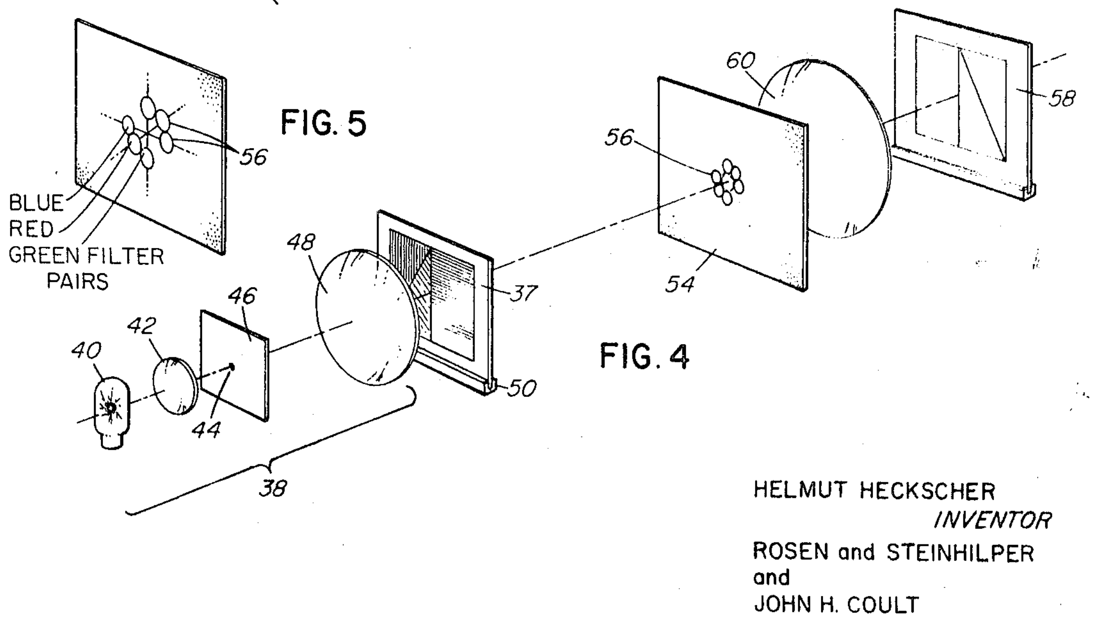
FIGS. 4 and 5 show schematically a coherent optical retrieval system for recovering information recorded by the process shown in FIGS. 1–3.

A full color reconstruction of the object recorded can be achieved by locating a spatial filter 54, shown enlarged in FIG. 5, in the Fourier transform space. The openings 56 in the filter 54 transmit only first orders associated with green, red, and blue color separation images; in each opening is located a spectral filter whose spectral characteristics correspond to the color information transmitted by that opening. Thus, with a filter as shown in FIG. 5 the color values in the recorded object which were encoded on the record 37 as modulations of azimuthally unique spatial carriers is reintroduced to produce a full color aerial reconstruction. The reconstruction may be viewed directly or displayed, as shown, on a screen 58 located at the output plane of the projection system. A projection lens 60 is needed to image the record 37 on the screen 58.

Figures 6, 8:
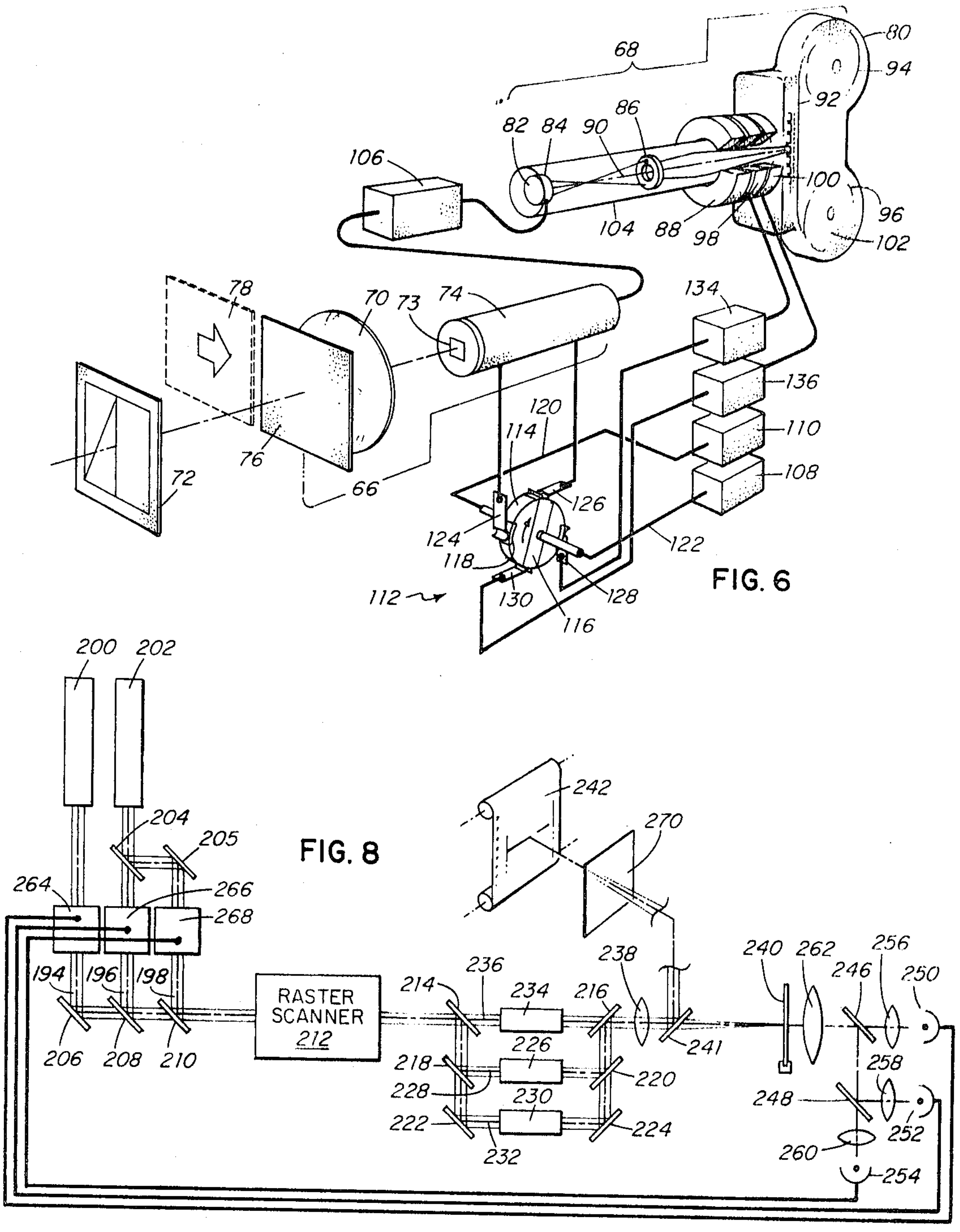
FIG. 6 illustrates in schematic form a recording system employing an electron beam recorder and a cathode-ray pickup tube for implementing the concept shown more broadly in FIG. 1.
FIG. 8 illustrates a system employing a plurality of laser beams for simultaneously scanning the images to be recorded and recording the said images.

FIG. 6 depicts an electron beam recording system for implementing the concepts of the invention depicted generally in FIG. 1. The FIG. 6 system is illustrated as being adapted to record two images in superposition, one modulating a horizontally oriented carrier, and the other modulating a vertically oriented carrier. The illustrated principles may be extended to record more than two images on a common area of a recording material.

The FIG. 6 system comprises a pickup section 66 and a recording section 68. The pickup section 66 may include a lens 70 for forming an image of an object 72 to be recorded on the photosensitive surface 73 of a cathode-ray pickup tube such as vidicon 74. By way of example, the FIG. 6 system is illustrated as being adapted to record two spectral zonal images in succession, the first through a spectral filter 76 (green, for example) and the second through a spectral filter 78 (blue, for example).

The recording section 68 includes an electron beam recorder 80 shown diagrammatically as comprising a cathode 82 for providing a source of electrons, a control electrode 84 for modulating the flow of electrons from the cathode 82, a stop 86, and a focusing coil 88 for focusing the electron beam 90 upon an electron beam-sensitive film 92 carried by supply and takeup reels 94 and 96. Horizontal and vertical magnetic deflection coils 98, 100 deflect, with proper commands, the beam in two orthogonal directions to produce a raster. The chamber 102 containing the film-holding reels 94, 96 is partially evacuated to a pressure somewhat higher than the pressure in the barrel 104 containing the electron beam, the film acting as a seal between the barrel enclosure and the magazine as it passes over the open end of the barrel 104.

Electronic signals produced by the vidicon 74 are supplied to video processing circuitry 106 before being sent to the control electrode 84 of the electron beam recorder 80.

In order that the deflection characteristic of the electron beams in the vidicon 74 and the electron beam recorder 80 are similar, common line deflection and field deflection circuitry 108, 110 is employed.

As discussed briefly above, the illustrated FIG. 6 system is adapted to record two area multiplex images, one impressed on a vertical carrier and one on a horizontal carrier. In order to illustrate in an extremely simple manner structure for changing the deflection mode of the vidicon 74 and electron beam recorder 80 from a horizontal raster scan to a vertical raster scan, a simple rotary switch 112 is provided. The switch 112 comprises a rotatable support member 114 having mutually insulated and orthogonally oriented electrical conductors 116, 118. The field deflection circuitry 110 is connected by a lead 120 to the conductor 118. The line deflection circuitry 108 is connected by a lead 122 to the conductor 116. Wiper contacts 124, 126 (and associated leads) connect the switch 112 to the vertical and horizontal deflection instrumentalities in the vidicon 74. Wiper contacts 128 and 130 (and associated leads) connect the switch 112 to the vertical and horizontal deflection coils 98, 100. Any differences in the requirements for the deflection signals supplied to the electron beam recorder 80 as compared to the deflection signals supplied to the vidicon 74 may be introduced in processing circuitry shown at 134, 136.

To record a pair of images on a single frame of the film 92, the switch 112 is set to the illustrated one of its two operative positions, the desired one of the filters 76, 78 is located on the optical axis, and the object 72 is caused to be imaged onto the screen of the vidicon 74. The image formed on the vidicon 74 will be scanned in a horizontal raster pattern to produce a train of electrical signals which are processed and sent to the control electrode 84 of the electron beam recorder 80. The image detected by the vidicon 74 is thus recorded on film 92 in the form of a signal modulating a horizontal spatial carrier. To record the second image, the switch 112 is rotated 90° to interchange the deflection signals supplied to the vertical and horizontal deflecting means in the vidicon 74 and in the electron beam recorder 80. The filter 76 is replaced by filter 78 and the vidicon is exposed to an image of the object 72 a second time. This image is scanned and detected by the vidicon 74 and recorded by the electron beam recorder 80 as a signal modulating a vertical spatial carrier.

After development, the record formed might appear similar to record 37 shown in FIG. 4, but will, of course, have only two carriers—a horizontal carrier and a vertical carrier. The information stored on the film 92 may be retrieved in a coherent optical projector very similar to the projector shown in FIG. 4, but having a spatial filter with only two pairs of openings, appropriately spectrally filtered, lying on mutually orthogonal (vertical and horizontal) axes.

Figure 7:
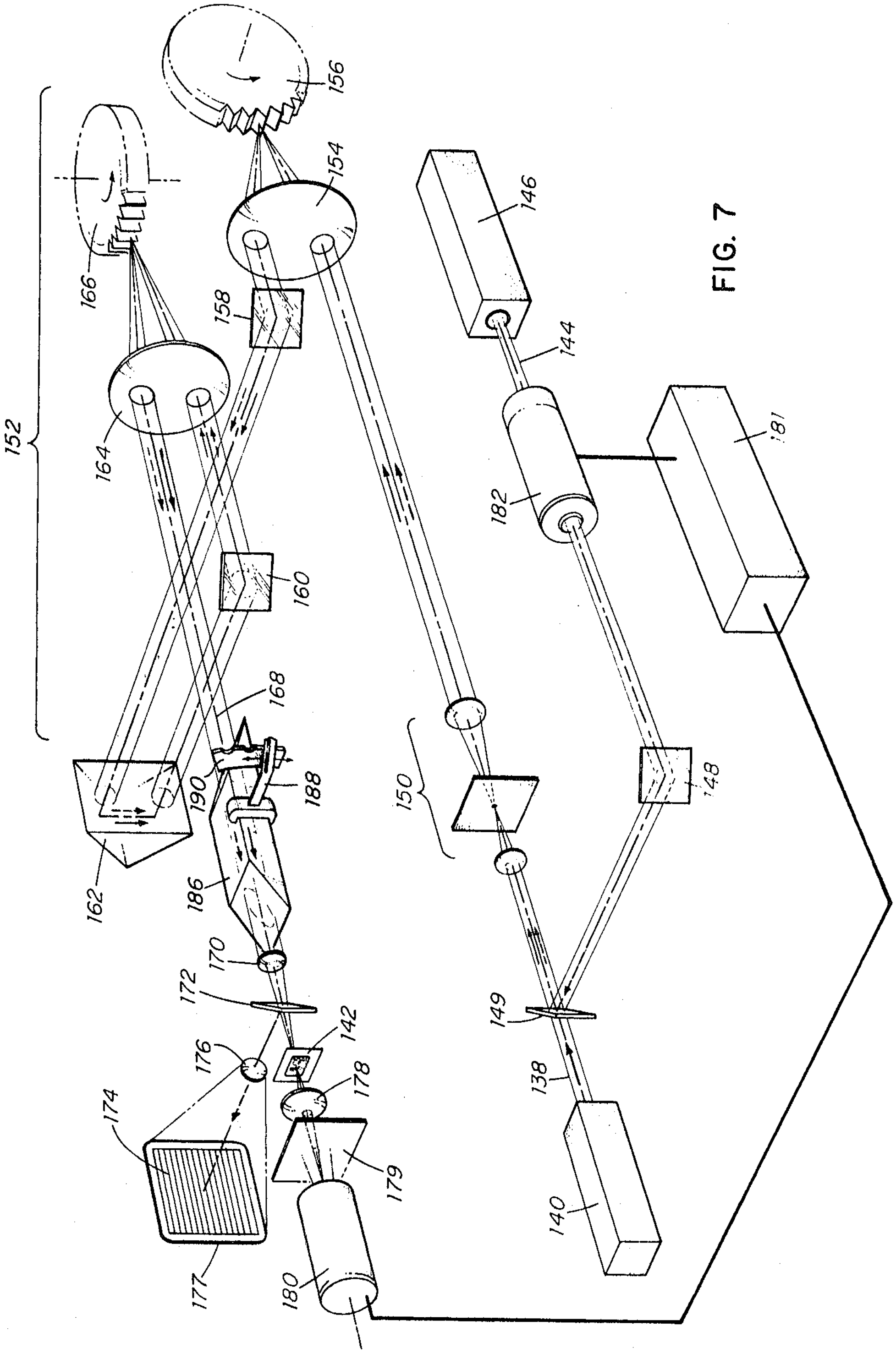
FIG. 7 illustrates a system for effecting area multiplex storage of a plurality of images utilizing raster scanned laser beams to both detect and record.

The FIG. 6 system utilizes electron beams to detect and record the plurality of images. FIG. 7 discloses an optical system for implementing the principles of the invention, utilizing laser beams for both detecting and recording a plurality of images as signals respectively modulating spatial carriers having different azimuthal orientations. As in the FIG. 6 system, the optical system shown in FIG. 7 provides inherent synchronization and correspondence of the pickup and recording rasters. As in the above-described systems, the recorded images may be images of a plurality of different objects or a plurality of images of a common object, for example, color separation images in different regions of the visible spectrum. The FIG. 7 system will now be discussed in detail.

A red beam 138 generated, for example, by a helium-neon laser 140 is used at the output end of the optical system to interrogate a transparency 142, representing, for example, a first document record. A green beam 144 generated, for example, by an argon-ion laser 146 is used to display at the output end of the optical system the information picked up by the interrogating red beam. The red beam 138 and the green beam 144 are introduced onto a common axis by a totally reflective mirror 148 and a dichroic beamsplitter 149. The beams 138, 144, are expanded in a beam expander stage 150 before being fed to a raster scanning system 152.

The raster scanning system 152 comprises a lens 154 performing the dual functions of focusing the input beams to a spot substantially in its back focal plane and then collecting light from the spot after reflection by a line-scanning corner mirror wheel 156 rotated through the back focal plane of lens 154. The corner mirror wheel 156 causes an image of the spot to move substantially in the back focal plane of the lens 154 in a direction parallel to the direction of motion of the corner mirrors on the wheel 156.

It will be noted that the aperture of the lens 154 is effectively divided into a pair of diametrically opposed portions, one of which is used in spot formation and the other of which is used in spot collection. Four reflective surfaces, shown as being constituted by two folding mirrors 158, 160, and a totally reflective prism 162, serve to introduce the angularly sweeping beam to the raster scanning stage of the system 152. The raster scanning stage comprises a lens 164 and a corner mirror wheel 166. The wheel 166 is rotated on an axis orthogonal to the axis of corner mirror wheel 156.

The lens 164 performs the dual functions of 1) focusing the coaxial beams to form a line substantially in its back focal plane in which lies the locus of travel of the raster-scanning corner mirror wheel 166, and 2) collecting light from the flying spot reflected from the wheel 166. It is evident from the above description that the effect of the raster-scanning corner mirror wheel 166 is to cause the line to be translated in a direction perpendicular to its length such that the flying spot image forms a raster.

As stated, the second function of the lens 164 is to collect light from the raster-defining flying spot which is reflected by the corner mirror wheel 166 to form substantially collimated output beams 168 performing an angular scan in two dimensions. It will be noted that like lens 154, the effective aperture of the lens 164 is divided into two diametrically opposed portions one of which is employed in the formation of the line on the corner mirror wheel 166, and the other of which is employed in the collection of light from the corner mirror wheel 166.

A lens 170 focuses the beams 168 through a dichroic beamsplitter 172 to form a red interrogating raster coincident with the transparency 142 and a green display raster 174 on an axis distinct from the axis of the interrogating raster. A projection lens 176 reimages the green display raster 174 upon a recording material 177.

Because the beams are coincident substantially throughout the system, the interrogating and display rasters are inherently synchronized and are aberration compensated.

Light from the modulated interrogating flying spot is collected by a relay lens 178, filtered by a red pass filter 179, and detected by a photomultiplier 180. A signal generated in the photomultiplier 180 is fed back to a driver 181 controlling a modulator 182 which modulates the green beam 144.

It is evident that the Fig. 7 system is effective to record the first document information stored on transparency 142 on the recording material 177 as an image modulating a spatial carrier having a horizontal orientation (i.e., vertical direction vector).

In accordance with the objects and teachings of this invention, in order that a plurality of images may be recorded in superposition on recording material 177, each modulating a spatial carrier having a unique azimuthal orientation, an azimuthally adjustable optical rotator, such as a Dove prism 186 is inserted in the coaxial beams 168. A Dove prism has the property of rotating an image through an angle equal to twice the angle through which the prism itself is rotated. Means for manually rotating the prism 186 is illustrated schematically as comprising a leaf spring lever 188 secured to the prism 186. A detent mechanism for locating and holding the prism 186 in a predetermined azimuthal orientation is illustrated as comprising an arcuate member 190 having depressions at the 0°, 22.5°, and 45° positions which cooperate with a protuberance on the lever 188. Thus, movement of the lever to the 22.5° position will effect a 45° rotation of the pickup and recording rasters. Similarly, rotation of the lever 188 to the 45° position will rotate the pickup and recording rasters to a vertical orientation.

To record a second document or other image on the recording material on a spatial carrier, e.g., at 45°, the transparency 142 is replaced by another containing the second image to be recorded and the prism 186 is rotated to its 22.5° position. The system is then activated, resulting in a recording of the second image on the recording material 177 in superposition with the first image and riding on a spatial carrier having a 45° orientation. Similarly a third arbitrary image may be stored on the recording material 177 on a 90° carrier by locating a record of the third image at the location of transparency 142, rotating the prism 186 to 45° position, and activating the system.

After development of the exposed recording material 177, the record produced might appear very similar to the record 34 shown in FIG. 4, having modulated spatial carriers at 0°, 45°, and 90°. The images stored on the record can be individually demodulated with a projector substantially as shown in FIG. 4, but having a rotatable mask with a single diametric pair of openings located at a given time to pass only the spectra of the desired image.

The principles of the invention may be used to record substantially more or less than three images in superposition, and may be used as described immediately above, to record images of completely different objects rather than different color separation images of a single object. The number of images which may be recorded is a function of the resolution desired in the retrieved images, the frequency of the carriers employed, the noise level in the system, and other factors.

In each of the above-described embodiments, the plurality of images are recorded successively using single pickup and recording rasters which are rotated between each recording operation. FIG. 8 depicts a system for recording red, blue, and green color separation images of an object simultaneously. The FIG. 8 system is illustrated as employing red, blue, and green laser beams 194, 196, and 198, respectively, derived from a helium-neon laser 200 and an argon-ion laser 202. A green-reflective dichroic mirror 204 and a totally reflective mirror 205 separate the green and blue beams 198, 196 from the argon-ion laser 202. The three beams are rendered coaxially by a totally reflective mirror 206 and a pair of partially reflective dichroic mirrors 208, 210 and fed to a common raster scanner 212. In order that the green, red and blue rasters ultimately formed by the scanner 212 have unique azimuthal orientations (here shown arbitrarily as being oriented at 0°, 45°, and 90°, respectively, to correspond with the descriptions of FIGS. 1–5), the coaxial beams are separated after passing through the scanner 212 by a pair of magenta-reflective mirrors 214, 216, a pair of blue reflective mirrors 218, 220, and a pair of totally reflective mirrors 222 and 224. A Dove prism 226 located in the blue beam 228 has a 45° orientation to give the blue pickup and recording rasters a vertical orientation. A Dove prism 230 in the red beam 232 oriented at 22.5° gives the red pickup and recording rasters a 45° orientation. A compensator 234 produces a path length change in the green beam 236 equal to that introduced in the blue and red beams 228, 232 by the prisms 226, 230, respectively.

A lens 238 converges the coaxial beams to form green, red, and blue rasters at 0°–45°–90° on a scanned transparency 240. A partially reflective beamsplitter 241 deflects a portion of the beams to form like rasters on a recording material 242.

The red, blue, and green information in the transparency 240 is separately detected by the use of a cyan-reflective mirror 246, and a blue reflective mirror 248 which separate the red, blue and green rasters and feed them to red, blue, and green detectors 250, 252, and 254, respectively. Lenses 256, 258, 260, form images of a field lens 262 adjacent the transparency 240 into the respective red, blue, and green detectors 250, 252, and 254. Information from the red, blue, and green detectors 250, 252, and 254 is fed to modulators 264, 266, and 268 located respectively in the red, blue, and green laser beams 194, 196, and 198 before entry into the scanner 212.

The optical modulators are of the type which modulate the state of polarization of the laser beams but have no effect on the intensities thereof. By this expedient the pickup rasters which scan the transparency 240 are not modulated in intensity. In order, however, that the recording rasters are modulated, an analyzer 270 is located between the beamsplitter 241 and the recording material 242. So that the analyzer 270 may be orthogonally oriented with respect to the plane of polarization of each of the red, blue, and green beams, the modulators 264, 266, and 268 are rotated about their longitudinal axis until such a condition prevails.

This invention is not limited to the particular details of construction of the embodiments depicted, and it is contemplated that various and other modifications and applications will occur to those skilled in the art. For example, the above-described methods and structures may be adapted to record a plurality of images modulating spatial carriers of like orientation but different spatial frequency (or different orientations and spatial frequencies) by merely adjusting the line frequency of the pickup and recording rasters.

Therefore, because certain changes may be made in the above-described apparatus and methods without departing from the true spirit and scope of the invention herein involved, it is intended that the subject matter of the above depiction shall be interpreted as illustrative and not in a limiting sense.

What is claimed is:

1. A method for recording in superposition on a common area of a recording material a plurality of images, which may be a plurality of different images of a single object or images of a plurality of different objects, such that each of the recorded images modulates a spatial carrier having a unique spatial characteristic, comprising:

scanning each of said images to be recorded in a two-dimensional pickup raster;

causing a spatial characteristic of the respective pickup rasters to differ for each of said images;

in correspondence with said scanning of said images, detecting a predetermined characteristic of the scanned images and developing electrical signals representing the detected time-varying characteristic of each of said plurality of images;

generating writing beam means for exposing a recording material sensitive to said beam;

causing said beam means to write said signals respectively characterizing said plurality of images on a predetermined common area of said material in a like plurality of two-dimensional write-out rasters, the write-out rasters corresponding in said spatial characteristic to the respective pickup raster so as to maintain said difference in said characteristic; and developing said material to produce a record on which said plurality of images respectively modulate unique spatial carriers.

2. A method for recording in superposition on a common area of a recording material a plurality of images, which may be a plurality of different images of a single object or images of a plurality of different objects, such that each of the recorded images modulates a spatial carrier having a different azimuthal orientation, comprising:

scanning each of said images to be recorded in a two-dimensional pickup raster;

causing the line sweep directions of the respective pickup rasters for said images to have a predetermined azimuthal separation;

in correspondence with said scanning of said images, detecting a predetermined characteristic of the scanned images and developing electrical signals representing the detected time-varying characteristic of each of said plurality of images;

generating writing beam means for exposing a recording material sensitive to said beam;

causing said beam means to write said signals respectively characterizing said plurality of images on a predetermined common area of said material in a like plurality of two-dimensional write-out rasters, the write-out rasters having an azimuthal separation corresponding to said predetermined azimuthal separation of said pickup rasters; and developing said material to produce a record on which said plurality of images respectively modulate spatial carriers having said predetermined azimuthal separation.

3. Apparatus for recording in superposition on a common area of a recording material a plurality of images, which may be a plurality of different images of a single object or images of a plurality of different objects, such that each of the recorded images modulates a spatial carrier having a different azimuthal orientation, comprising:

pickup scanning means for scanning each of said images to be recorded in a two-dimensional pickup raster;

sweep changing means for causing the line sweep directions of the respective pickup rasters for said images to have a predetermined azimuthal separation;

means for detecting in correspondence with said scanning of said images, a predetermined characteristic of the scanned images and developing electrical signals representing the detected time-varying characteristic of each of said plurality of images;

means for generating writing beam means for exposing a recording material sensitive to said beam; and write-out scanning means for causing said beam means to write said signals respectively characterizing said plurality of images on a predetermined common area of said material in a like plurality of two-dimensional write-out rasters, the write-out rasters having an azimuthal separation corresponding to said predetermined azimuthal separation of said pickup rasters.

4. The apparatus defined by claim 3 wherein said write-out scanning means includes electron beam recording means and means for supplying deflection commands to said recording means.

5. The apparatus defined by claim 3 wherein said pickup scanning means comprises a laser and optical beam deflecting means for deflecting a beam from said laser across the object, and wherein said sweep changing means comprises optical rotating means for rotating the raster patterns produced by said beam deflecting means to effect said predetermined azimuthal separation between said pickup rasters.

6. The apparatus defined by claim 5 wherein said means for generating writing beam means comprises a laser and wherein means are provided for directing a beam from said laser through said optical beam deflecting means and said optical rotating means to produce said plurality of write-out rasters having said predetermined azimuthal separation.

7. The apparatus defined by claim 6 wherein the pickup and write-out laser beams have different dominant wavelengths, and wherein said apparatus includes means for directing said pickup and write-out laser beams coaxially through said optical beam deflecting and optical rotating means and spectrally sensitive mirror means in the path of said beams for physically separating the pickup and write-out rasters.

8. A method of area multiplex storage and retrieval of a plurality of images, which may be a plurality of different images of a single object or images of a plurality of different objects, comprising:

scanning each of said images to be recorded in a two-dimensional pickup raster;

causing the line sweep directions of the respective pickup rasters for said images to have a predetermined azimuthal separation;

in correspondence with said scanning of said images, detecting a predetermined characteristic of the scanned images and developing electrical signals representing the detected time-varying characteristic of each of said plurality of images;

generating writing beam means for exposing a recording material sensitive to said beam;

causing said beam means to write said signals respectively characterizing said plurality of images on a predetermined common area of said material in a like plurality of two-dimensional write-out rasters, the write-out rasters having an azimuthal separation corresponding to said predetermined azimuthal separation of said pickup rasters;

developing said material to produce a record on which said plurality of images respectively modulate spatial carriers having said predetermined azimuthal separation;

optically Fourier transforming said record to effect a spatial separation in a Fourier transform space of spatial frequency spectra uniquely characterizing each of said images;

passing exclusively through said Fourier transform space a spectrum of a selected image; and collecting and retransforming the transmitted spectrum to reconstruct said selected image.

9. A method for recording in superposition on a common area of a recording material a plurality of images, which may be a plurality of different images of a single object or images of a plurality of different objects, each of the recorded images modulating a spatial carrier having a different azimuthal orientation, comprising:

scanning said images to be recorded successively with a two-dimensional pickup raster while effecting a predetermined azimuthal displacement of the line sweep direction of the scanning raster for each successive image scanned;

in correspondence with said scanning of said images, detecting a predetermined characteristic of the scanned images and developing electrical signals representing the detected time-varying characteristic of each of said plurality of images;

generating a writing beam for exposing a recording material sensitive to said beam;

causing said beam to write a first interval of said signals characterizing a first of said images on a predetermined area of said material in a first two-dimensional raster having a first azimuthal orientation;

causing said beam to write a second interval of said signals characterizing a second of said images on said area of said material in superposition with said first image in a two-dimensional raster having a second line orientation distinct from the said first orientation of said first raster, said first and second raster line orientations having a relative angular separation corresponding to said predetermined azimuthal displacement of the effective line direction for successive image scans; and developing said material to produce a record on which said plurality of images respectively modulate spatial carriers of like spatial frequency but distinct azimuthal orientation.

30. A method for recording in superposition on a common area of a recording material a plurality of images, which may be a plurality of different images of a single object or images of a plurality of different objects such that each of the recorded images modulates a spatial carrier having a different azimuthal orientation, comprising:

scanning said images to be recorded successively with a two-dimensional pickup raster while effecting a predetermined azimuthal displacement of the line sweep direction of the scanning raster for each successive image scanned;

in correspondence with said scanning of said images, detecting a predetermined intensity characteristic of the scanned images and developing electrical signals representing the detected time-varying intensity characteristic of each of said plurality of images;

generating an electron writing beam for exposing a recording material which is sensitive to said beam and which exhibits, when developed, a density distribution varying in accordance with exposure variations produced by said electron writing beam;

causing said beam to write a first interval of said signals characterizing a first of said images on a predetermined area of said material in a first two-dimensional raster having a first azimuthal orientation;

causing said beam to write a second interval of said signals characterizing a second of said images on said area of said material in superposition with said first image in a two-dimensional raster having a second line orientation distinct from the said first orientation of said first raster, said first and second raster line orientations having a relative angular separation corresponding to said predetermined azimuthal displacement of the effective line direction for successive image scans; and developing said material to produce a density record on which said plurality of images respectively modulate spatial carriers of like spatial frequency but distinct azimuthal orientation.

A method of area multiplex storage and retrieval, of a plurality of color separation images of an object, comprising:

scanning each of said images to be recorded in a two-dimensional pickup raster;

causing the line sweep directions of the respective pickup rasters for said images to have a predetermined azimuthal separation;

in correspondence with said scanning of said images, detecting a predetermined intensity characteristic of the scanned images and developing electrical signals representing the detected time-varying intensity characteristic of each of said plurality of images;

generating an electron writing beam for exposing a recording material which is sensitive to said beam and which exhibits, when developed, a density distribution varying in accordance with exposure variations produced by said electron writing beam;

causing said beam means to write said signals respectively characterizing said plurality of color separation images on a predetermined common area of said material in a like plurality of two-dimensional write-out rasters, the write-out rasters having an azimuthal separation corresponding to said predetermined azimuthal separation of said scanning rasters;

developing said material to produce a density record on which said plurality of images respectively modulate spatial carriers having said predetermined azimuthal separation;

optically Fourier transforming said record to produce a diffraction pattern containing diffracted spatial frequency spectra uniquely characterizing each of said images and a zeroth order characterizing the spectrum of the sum of said images;

passing through said Fourier transform space a diffracted spectrum of each of said images;

color filtering each of the transmitted spectra such that the color of the light passed corresponds to the color separation information carried thereby;

passing through said Fourier transform space a fraction of the zeroth order energy; and collecting and retransforming the transmitted spectra.

A method for recording in superposition on a common area of a recording material three color separation images of an object such that each of the recorded images modulates a spatial carrier having a different azimuthal orientation, comprising:

scanning in succession, red, blue, and green color separations of the object to be recorded in a two-dimensional pickup raster while causing the line sweep directions of the respective scanning rasters for said color separations to have a predetermined azimuthal separation;

in correspondence with said scanning of said object, detecting a predetermined characteristic of the scanned color separations and developing electrical signals representing the detected time-varying said characteristic of each of said red, blue, and green color separations;

generating a writing beam for exposing a recording material sensitive to said beam;

causing said beam to write a first interval of said signals characterizing a first of said color separations on a predetermined area of said material in a first write-out raster having a first line orientation corresponding to the orientation of the said pickup raster for said first color separation;

subsequently causing said beam to write a second interval of said signals characterizing a second of said color separations on said area of said material in superposition with said first color separation in a second write-out raster having a second line orientation corresponding to the orientation of the said pickup raster for said second color separation;

still later causing said beam to write a third interval of said signals characterizing the third of said color separations on said area of said material in superposition with said first and second color separations in a third write-out raster having a third line orientation corresponding to the orientation of the said pickup raster for said third color separation; and developing said material to produce a record on which said plurality of color separations respectively modulate spatial carriers having like spatial frequency and said predetermined azimuthal separation.

13. Apparatus for recording in superposition on a common area of a recording material a plurality of images, which may be a plurality of different images of a single object or images of a plurality of different objects, such that each of the recorded images modulates a spatial carrier having a different azimuthal orientation, comprising:

means producing a plurality of distinguishable pickup beams;

pickup beam deflection means operating on said pickup beams for simultaneously scanning each of said images to be recorded in a two-dimensional pickup raster while causing the line sweep directions of the respective pickup rasters to have a predetermined azimuthal separation;

means for detecting in correspondence with said scanning of said images a characteristic of each of the scanned images and developing electrical signals representing the detected time-varying said characteristic of each of said plurality of images;

means for generating a like plurality of write-out beams for exposing a recording material sensitive to intensity fluctuations in each of said write-out beams;

write-out beam deflection means operating on said write-out beams for simultaneously scanning a common area of said recording material with said beams in respective two-dimensional write-out rasters while causing the line sweep directions of the respective write-out rasters to have said predetermined azimuthal separation;

beam modulation means controlled by said signals for respectively modulating said write-out beams with information respectively characterizing said images; and developing said recording material to produce a record on which said plurality of images respectively modulate spatial carriers having said predetermined azimuthal separation.

14. Apparatus for recording in superposition on a common area of a recording material a plurality of color separation images of an object such that each of the recorded images modulates a spatial carrier having a different azimuthal orientation, comprising:

pickup laser means producing a plurality of coaxial pickup laser beams of different dominant wavelengths respectively determining the spectral characteristic of said plurality of color separation images;

pickup beam deflection means operating on said pickup beams for simultaneously scanning said object with said beams in a respective two-dimensional pickup raster while causing the line sweep directions of the respective pickup rasters to have a predetermined azimuthal separation, whereby a raster of a particular orientation is uniquely associated with a laser beam and color separation information of each particular dominant wavelength;

in correspondence with said scanning of said object, detecting an intensity characteristic of the color separation distributions associated with each of said rasters and developing electrical signals representing the detected time-varying characteristic of each of said plurality of color separation distributions;

write-out laser means for generating a like plurality of write-out laser beams for exposing a recording material sensitive to intensity fluctuations in each of said beams;

write-out beam deflection means operating on said write-out beams for simultaneously scanning a common area of said recording material with said beams in respective two-dimensional write-out rasters while causing the line sweep directions of the respective write-out rasters to have said predetermined azimuthal separations;

beam modulation means controlled by said signals for respectively modulating said write-out laser beams with information characterizing said color separation distributions; and developing said recording material to produce a record on which said plurality of color separation images respectively modulate spatial carriers having said predetermined azimuthal separation.

* * * * *

PO-1050
(5/69)

UNITED STATES PATENT OFFICE
CERTIFICATE OF CORRECTION

Patent No. 3,624,278 Dated November 30, 1971

Inventor(s) HELMUT HECKSCHER

It is certified that error appears in the above-identified patent and that said Letters Patent are hereby corrected as shown below:

Column 9, line 70, "30" should be --10--;
Column 10, line 33, number claim 11;
Column 11, line 1, number claim 12;

Signed and sealed this 16th day of May 1972.

(SEAL)
Attest:

EDWARD M.FLETCHER,JR.
Attesting Officer

ROBERT GOTTSCHALK
Commissioner of Patents